April 12, 1932.   C. W. VAN RANST   1,853,476
SPARE WHEEL LOCKING AND HOLDING MEANS
Filed May 31, 1929
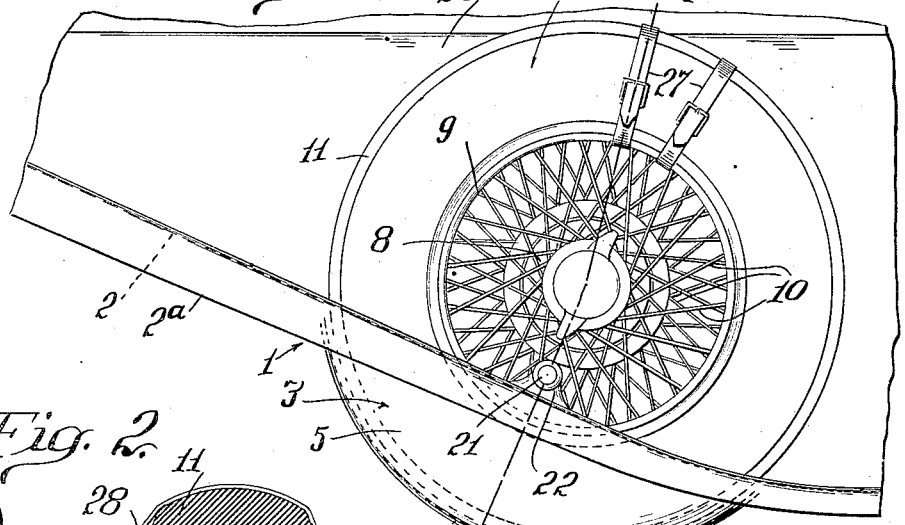
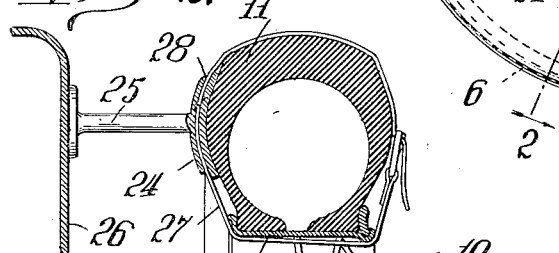
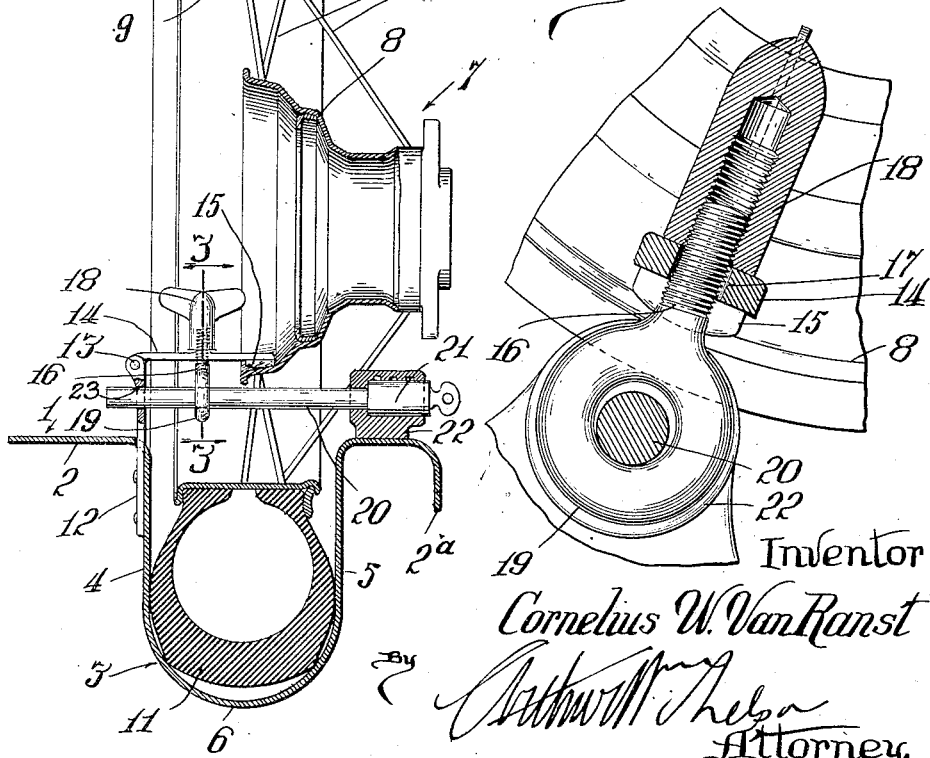
Inventor
Cornelius W. Van Ranst
By
Attorney.

Patented Apr. 12, 1932

1,853,476

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

SPARE WHEEL LOCKING AND HOLDING MEANS

Application filed May 31, 1929. Serial No. 367,411.

This invention relates to improvements in spare wheel locking and holding means and it consists of the matters hereinafter described and more particularly pointed out in the appended claims.

In many automobiles, it is now customary to carry a spare wheel at the side of the car and under such conditions, the front fender is provided with a well or seat to receive the bottom of the wheel, while the top portion of the wheel is engaged against and is strapped to an arm projecting from the side of the body of the automobile.

The primary object of the invention is to provide an improved means in a structure of this kind wherein the wheel is locked in said well in a manner preventing vibration of the wheel in the well and the resulting noise therefrom.

Another object of the invention is to provide such a means, as is of simple construction so that its cost is reduced and its operation requires but little effort.

These objects of the invention as well as others, together with the many advantages thereof, will more fully appear as I proceed with my specification.

In the drawings:

Fig. 1 is a view in side elevation of a part of an automobile embodying my improved construction.

Fig. 2 is a vertical sectional view therethrough on an enlarged scale as taken on the line 2—2 of Fig. 1.

Fig. 3 is another detail vertical sectional view on an enlarged scale as taken on the line 3—3 of Fig. 2.

Referring now in detail to that embodiment of my invention illustrated in the accompanying drawings, 1 indicates as a whole the left front fender of an automobile having a top wall 2 with a depending strengthening and finishing flange 2ª along its outer margin. In said top wall of the fender is provided a well or seat 3 to receive a portion of a spare wheel. Said well is in the form of an arcuate depression including inner and outer upright side portions 4 and 5, respectively, and a transversely rounded bottom portion 6.

7 indicates as a whole a spare wheel. The wheel as shown herein is a wire wheel but as will be apparent, the invention can also be employed in connection with other types of wheels. Said wheel includes a hub shell 8 and a rim 9 operatively connected together by the usual wire spokes 10. On the rim is mounted a tire 11 usually of a diameter fitting the well.

Means are provided on the fender for so engaging the hub shell as to force the bottom portion of the wheel into the well in a vibration and rattle-proof manner and such means is as follows: Secured to the rear face of the well portion 4 in the plane of its greatest radial depth is a flat bar-like post 12 that projects up through the top wall of the fender a suitable distance. Pivoted to the top end of said post as at 13 is a presser foot lever or plate 14 having a resilient foot 15 at one end. This foot is preferably made of rubber and is adapted for engagement with the inner surface of the central portion of the wheel, which central portion in this instance is the hub shell 8.

Associated with said presser foot plate or lever is an eye bolt 16, the top end of which projects up through an opening 17 in said plate midway between its ends and is there adapted to receive a wing-nut 18, the bottom end of said bolt having an eye 19 thereon.

20 indicates a locking bar carrying a lock cylinder 21 at one end adapted to coact with a cylinder receiving boss 22 fixed to the top of the fender between the well 3 and flange 2ª. In the flat bar or post 12 is a hole 23 through which the other end of the locking rod is adapted to extend.

That portion of the tire 11 at the top of the wheel when the same is in position in the well normally engages against a curved plate 24 on the outer end of an arm 25 extending laterally from a portion 26 of the body of the automobile as best shown in Fig. 2. Straps 27 are passed around the tire and rim portions in the plane of said plate 24 and also through openings 28 in said plate, the strap ends being buckled together.

To apply a spare wheel to the fender, let it be assumed that the rod 20 together with its lock cylinder has been removed and the presser foot or lever 14 has been swung about the pivot 13 into a position opposite that shown in Fig. 2, the eye bolt 16 and wing-nut 18 still being carried thereby in a loosened condition.

The wheel is then positioned so that its bottom portion is located in the well, after which the presser foot plate or lever is swung into a position wherein the rubber foot thereof engages the inner surface of the hub shell. The inner end of the rod 20 is then inserted through the lug or boss 22 and the eye of the bolt 16 is so turned that said end may be passed therethrough and entered into the opening 23 in the upright flat bar 12 after which the cylinder is locked to the boss as by means of the key shown in Fig. 2.

The winged nut 18 is then screwed down tight on the bolt so that the presser foot bar or lever is tensioned whereby the presser foot exerts a pressure forcing the bottom part of the wheel into a good snug fit in the well.

The top part of the wheel now engages with the plate 24 after which the strap ends are caused to embrace the rim and tire and are drawn taut and buckled together.

Even though some unauthorized party should remove the winged nut, he cannot remove the wheel because of the rod which passes through the wheel between the spokes thereof.

The structure described is simple as it comprises but a few parts which are easily manipulated only by an authorized party. It holds the wheel in the well in a manner preventing its vibration and rattling and the parts are so arranged as to disclose only the lock boss to view from the side of the automobile.

While in describing my invention I have referred in detail to the form, arrangement and construction of the various parts thereof, the same is to be considered merely as illustrative, so that I do not wish to be limited thereto except as may be pointed out in the appended claims.

I claim as my invention:

1. In combination with an automobile, means providing a seat to receive a portion of a spare wheel, a lever pivoted with respect to a fixed part on the automobile and adapted when in one position to engage a hub portion of said wheel, a locking bar adapted to be inserted through the wheel, and manually operable means engaged at its ends with said lever and bar respectively, for exerting a pressure on the lever for forcing said portion of the spare wheel against its seat.

2. In combination with an automobile fender having a well therein to receive a portion of a spare wheel, a lever pivoted at one end with respect to said fender and adapted for engagement at its other end with a hub portion of said spare wheel, a locking bar adapted to be secured at one end to the fender and to extend through the wheel and a device engaged at one end with said bar and at its other end with said lever for forcing said portion of the spare wheel into said well.

3. In combination with an automobile having a fender with a well therein to receive a portion of a spare wheel, an upright post secured to said fender, a lever pivoted at one end to said post and adapted for engagement at its other end with a hub portion of said spare wheel, a rod detachably secured at one end to the fender and extending at its other end through said post and manually operable means fixed at one end to said rod and extending at its other end through said lever and adapted to exert a pressure thereon for forcing the first-mentioned portion of the wheel into said well.

4. In combination with an automobile having a fender with a well therein to receive a portion of a spare wheel, an upright post secured to said fender at one side of the well, a lever pivoted at one end to said post and adapted for engagement at its other end with a second portion of said spare wheel, a boss on said fender at the other side of the well, a locking bar adapted to be inserted through said wheel and to engage at one end with said post and at its other end with said boss, an eye bolt adapted for engagement at one end with said bar and to extend at its other end through said lever and a nut on said last-mentioned end of said bolt for exerting a pressure on said lever to force said first-mentioned portion of the spare wheel into said well.

In testimony whereof, I have hereunto set my hand, this 28 day of May, 1929.

CORNELIUS W. VAN RANST.